United States Patent
Hayashi et al.

(10) Patent No.: US 11,312,632 B2
(45) Date of Patent: Apr. 26, 2022

(54) TUNGSTEN CARBIDE POWDER

(71) Applicant: A.L.M.T. Corp., Tokyo (JP)

(72) Inventors: Takehiko Hayashi, Toyama (JP);
Tomoyuki Ishida, Toyama (JP);
Takahiro Yamakawa, Toyama (JP)

(73) Assignee: A.L.M.T. Corp., Tokyo (JP)

( * ) Notice: Subject to any disclaimer, the term of this patent is extended or adjusted under 35 U.S.C. 154(b) by 334 days.

(21) Appl. No.: 16/341,624

(22) PCT Filed: Oct. 12, 2017

(86) PCT No.: PCT/JP2017/036955
§ 371 (c)(1),
(2) Date: Apr. 12, 2019

(87) PCT Pub. No.: WO2018/070466
PCT Pub. Date: Apr. 19, 2018

(65) Prior Publication Data
US 2020/0346935 A1 Nov. 5, 2020

(30) Foreign Application Priority Data

Oct. 13, 2016 (JP) .............................. JP2016-201874

(51) Int. Cl.
*C01B 32/949* (2017.01)

(52) U.S. Cl.
CPC ........ *C01B 32/949* (2017.08); *C01P 2004/61* (2013.01); *C01P 2004/62* (2013.01); *C01P 2006/10* (2013.01); *C01P 2006/11* (2013.01); *C01P 2006/12* (2013.01)

(58) Field of Classification Search
None
See application file for complete search history.

(56) References Cited

FOREIGN PATENT DOCUMENTS

| CN | 101985356 A | 3/2011 |
|---|---|---|
| CN | 103626181 A | 3/2014 |
| JP | H11-021119 A | 1/1999 |
| JP | 2000-072429 A | 3/2000 |
| JP | 2001-072406 A | 3/2001 |
| JP | 2005-335997 A | 12/2005 |
| JP | 2005-336536 A | 12/2005 |
| JP | 2006-131974 A | 5/2006 |
| JP | 2008-031016 A | 2/2008 |
| JP | 2009-242181 A | 10/2009 |

OTHER PUBLICATIONS

Yamamoto, Yoshihara, "Development of Production Technology of Ultrafine WC Powder," J. Jpn. Soc. Powder Powder Metallurgy, Aug. 2012, pp. 451-458, vol. 59, No. 8.

(Continued)

*Primary Examiner* — Ronak C Patel
(74) *Attorney, Agent, or Firm* — Baker Botts L.L.P.; Michael A. Sartori (57) ABSTRACT

Provided is a tungsten carbide powder satisfying such a condition that when the Fsss particle size thereof is represented by a (μm) and the BET particle size thereof converted from the BET specific surface area is represented by b (μm), a is 0.40 μm or more and 1.50 μm or less, and b/a is 0.17 or more and 0.35 or less.

3 Claims, 3 Drawing Sheets (56) References Cited

OTHER PUBLICATIONS

Bock A. et al., "Production and characterization of ultrafine WC powders," International Journal of Refractory Metals & Hard Materials, vol. 20, No. 1, Jan. 1, 2002, pp. 23-30 [Cited in EESR].
Jiqiao L. et al., "Particle size characterization of ultrafine tungsten powder," International Journal of Refractory Metals & Hard Materials, vol. 19, No. 2, Mar. 1, 2001, pp. 89-99 [Cited in EESR].
Extended European Search Search issued in counterpart European Patent Application No. 17861050.7 dated Mar. 24, 2020.
Office Action issued in Chinese Application No. 201 780063089.8, dated Nov. 29, 2021.
Kumar et al., "The sintering kinetics of ultrafine tungsten carbide powders", ScienceDirect, Ceramics International 37 (2011) (2011) pp. 2643-2654. [Cited in NPL 1].

TUNGSTEN CARBIDE POWDER

TECHNICAL FIELD

The present invention relates to a tungsten carbide powder.

The present application claims the benefit of priority to Japanese Patent No. 2016-201874 filed on Oct. 13, 2016, the entire contents of which are incorporated herein by reference.

BACKGROUND ART

A conventional tungsten carbide powder is disclosed in, for example, Japanese Patent Laying-Open No. 11-21119 (Patent Literature 1) and Japanese Patent Laying-Open No. 2009-242181 (Patent Literature 2).

CITATION LIST

Patent Literature

PTL 1: Japanese Patent Laying-Open No. 11-21119
PTL 2: Japanese Patent Laying-Open No. 2009-242181

SUMMARY OF INVENTION

However, the problem is that the conventional tungsten carbide fine powder is bulky.

Therefore, an object of the present invention is to provide a tungsten carbide powder that has a low bulk.

The tungsten carbide powder according to the present invention satisfies such a condition that when the Fsss particle size thereof is represented by a (μm) and the BET particle size thereof converted from the BET specific surface area is represented by b (μm), a is 0.40 μm or more and 1.50 μm or less, and b/a is 0.17 or more and 0.35 or less.

DETAILED DESCRIPTION

Description of Embodiments

First, embodiments of the present invention will be enumerated and described hereinafter.

1. (Product Invention)

The problem is that the conventional tungsten carbide fine powder is bulky. Generally, as a powder becomes finer, the void between the particles increases, and thereby, the bulk of the powder increases. In other words, the density of the powder decreases. The bulk of the powder is largely affected by the presence of particle agglomerates in the tungsten carbide powder.

As used herein, the term of "tungsten carbide powder" refers to not only a powder composed of carbon and tungsten but also a powder composed of carbon, tungsten and other elements. Other elements may have no effect or a preferable effect on the properties of cemented carbide during the process of producing the same. As examples of other elements, chromium, vanadium, tantalum, niobium, titanium and the like may be given.

Generally, in producing cemented carbide, the tungsten carbide powder serving as the main component is subject to a batch process in which it is mixed with a binder such as cobalt powder or nickel powder and, if necessary, with an additive such as a trace amount of chromium carbide powder. During the batch process, if the bulk of the tungsten carbide powder serving as the main component is high, the amount of powder to be charged will be less, deteriorating the productivity.

The sufficiently mixed powder is sintered after pressing, but if the density of the press-molded body is low, the shrinkage rate of the sintered body is large, and thereby, it is difficult to sinter the press-molded body into a desired shape. In addition, if the product shape is complex, it would be difficult to uniformly apply the pressing pressure, and thereby, cracks are likely to occur in the stepped portion. In order to obtain a press-molded body with a desired density, it is required to apply a higher pressing pressure, which applies a burden on the press machine or the die.

On the other hand, when pulverizing the particle agglomerates in the bulky tungsten carbide powder, the primary particles are pulverized as well, resulting in tungsten carbide powder of extremely fine particle size. Since the particle size of the tungsten carbide particles is extremely fine, they are easy to grow during sintering, which makes it difficult to obtain cemented carbide of ultrafine particle size.

In order to lower the bulk of the tungsten carbide powder, the inventors of the present invention focused attention on the Fsss particle size representing the secondary particle size and the BET particle size representing the primary particle size, and they found that the tungsten carbide powder would be less bulky if it satisfies such a condition that when the Fsss particle size thereof is represented by a (μm) and the BET particle size thereof converted from the BET specific surface area is represented by b (μm), a is 0.40 μm or more and 1.50 μm or less, and b/a is 0.17 or more and 0.35 or less.

The Fsss particle size may be measured by using a Sub-Sieve Sizer model 95 manufactured by Fisher Scientific. The BET specific surface area may be measured by using a BET measuring machine (Macsorb HM model 1208 manufactured by Mountech Co., Ltd).

The above-mentioned tungsten carbide powder has a smaller BET particle size (i.e., a greater specific surface area) even at the same Fsss particle size as the conventional tungsten carbide powder, which means that when a particle agglomerate is pulverized, the contact area between the tungsten carbide particles becomes smaller, which thereby makes the BET specific surface area larger.

In other words, the above-mentioned tungsten carbide powder is less likely to agglomerate, and thereby is less bulky even with the same Fsss particle size as the conventional tungsten carbide powder.

Preferably, when the tapped volume (cm$^3$/100 g) is represented by y, y=−5.97a+z (z=22.56 or less).

Preferably, the Fsss particle size a (μm) is 0.40 μm or more and 1.00 μm or less.

If the tungsten carbide powder is less bulky, the density of a press-molded body formed by press molding may be increased, which makes possible to reduce the shrinkage rate at the time of producing the cemented carbide. There are various compositions and manufacturing conditions for cemented carbide. In order to exhibit the inherent features of the tungsten carbide powder of the present invention, when the tungsten carbide powder only is pressed at a pressure of 98 MPa and molded to a press-molded body, and the density of press-molded body is represented by p, p=1.86a+q (q=6.8 or more).

Details of Embodiment of Present Invention

Specific examples of the tungsten carbide powder according to an embodiment of the present invention will be described below. It should be noted that the present invention is not limited to these illustrative examples but defined by the scope of the claims and encompasses all modifications equivalent in meaning and scope to the claims.

A tungsten carbide powder being less likely agglomerated which causes a beneficial result, because of the low bulk of the tungsten carbide, during the manufacturing step of the various products in which the tungsten carbide powder is used as a raw material, and a manufacturing method thereof can be provided.

Specifically, the above-mentioned tungsten carbide powder is less bulky, in other words, there are less particle agglomerates in the tungsten carbide powder. Thereby, the following effects may be expected. It is possible to charge a greater amount of tungsten carbide powder into the mixing device. When the tungsten carbide powder is used to manufacture cemented carbide, it is possible to improve the miscibility in the step of mixing with other powders and shorten the mixing time. Furthermore, the tungsten carbide powder may be packed into the metal mold at a higher packing density during press molding, which makes it possible to obtain a sintered body at a larger size. It is also possible to lower the pressing pressure. Thus, it is possible to reduce the shrinkage rate during sintering so as to prevent the sintered body from warping and cracking.

Figure 1:
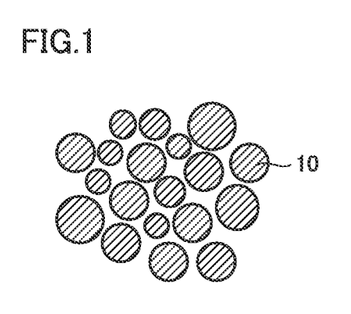
FIG. 1 is a schematic view of a tungsten carbide powder according to an embodiment.

FIG. 1 is a schematic view of a tungsten carbide powder according to an embodiment. As illustrated in FIG. 1, the tungsten carbide powder 10 according to the embodiment does not cluster together to form particle agglomerate.

Figure 2:
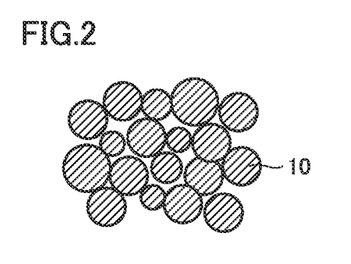
FIG. 2 is a schematic view illustrating the packing of powder so as to produce a press-molded body from the tungsten carbide powder according to an embodiment.

FIG. 2 is a schematic view the packing of powder so as to produce a press-molded body from the tungsten carbide powder according to an embodiment. As illustrated in FIG. 2, it can be seen that in the press-molded body formed from the tungsten carbide powder 10 according to the embodiment, there is less void between the tungsten carbide powders 10. This is because that the tungsten carbide powder 10 does not cluster together to form particle agglomerate, and thereby, the tungsten carbide powder 10 may be packed at a high density.

Figure 3:
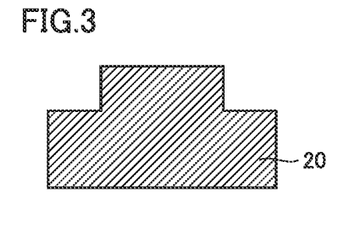
FIG. 3 is a schematic view illustrating a sintered body produced from the tungsten carbide powder according to an embodiment.

FIG. 3 is a schematic view illustrating a sintered body produced from the tungsten carbide powder according to the embodiment. As illustrated in FIG. 3, since a sintered body 20 according to the embodiment is manufactured from the high-density press-molded body (FIG. 2), it is dense and has less voids. As a result, the shrinkage rate thereof is low, which makes it possible to prevent the occurrence of cracks.

Figure 4:
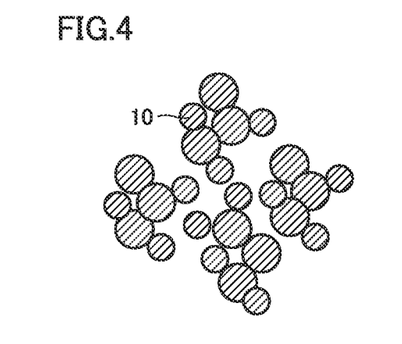
FIG. 4 is a schematic view of a tungsten carbide powder according to a comparative example.

FIG. 4 is a schematic view of a tungsten carbide powder according to a comparative example. As illustrated in FIG. 4, the tungsten carbide powder 10 according to the comparative example clusters together to form particle agglomerates.

Figure 5:
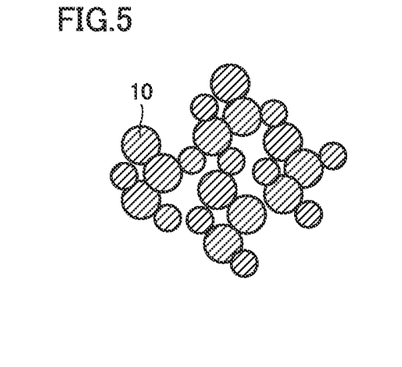
FIG. 5 is a schematic view illustrating the packing of powder so as to produce a press-molded body from the tungsten carbide powder according to a comparative example.

FIG. 5 is a schematic view illustrating the packing of powder so as to produce a press-molded body from the tungsten carbide powder according to a comparative example. As illustrated in FIG. 5, it can be seen that in the press-molded body formed from the tungsten carbide powder 10 according to the comparative example, there are many voids between the tungsten carbide powders 10. This is because that the tungsten carbide powder 10 clusters together to form particle agglomerates with irregular shapes, and thereby, the tungsten carbide powder 10 can only be packed at a low density.

Figure 6:
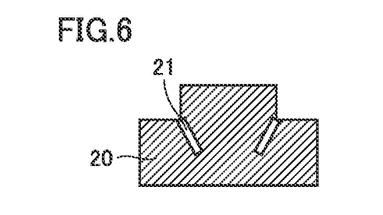
FIG. 6 is a schematic view illustrating a sintered body produced from the tungsten carbide powder according to a comparative example.

FIG. 6 is a schematic view illustrating a sintered body produced from a tungsten carbide powder according to a comparative example. As illustrated in FIG. 6, the sintered body 20 according to the comparative example requires to be pressed at a higher pressure because it has a lower density under the same pressing pressure. In the case where there is a step portion in the press-molded body as illustrated in FIG. 6, a crack 21 is likely to occur due to the density difference in the press-molded body.

As illustrated in FIGS. 4 to 6, in the case where the tungsten carbide powder 10 contains a lot of particle agglomerates, since it is easy for the density difference to occur in the press-molded body in an attempt to increase the density of the molded body, a crack 21 is likely to occur in the sintered body 20 (product). On the other hand, as illustrated in FIGS. 1 to 3, the tungsten carbide powder 10 contains less particle agglomerates and has a low bulk, which makes it possible to obtain the press-molded body with a higher density and a lower shrinkage even at a lower pressing pressure, and thereby, the sintered body 20 (product) may be made larger even when the press-molded body of the same size is used.

The tungsten carbide powder is made from tungsten carbide, contains less agglomerates and has a high bulk density, and it is found that the effect thereof may be obtained by setting the following particle size to a predetermined range.

As a method for evaluating particle agglomerates in a powder, the degree of particle agglomerates is usually evaluated by comparing the particle agglomerates before and after the application of a certain external force, but factors other than the powder such as the pretreatment condition may also influence the degree of particle agglomerates if the power is subjected to a lot of processes. When preparing a powder which is called ready-to-press powder for producing cemented carbide, none of various compositions and processing conditions was found to affect the shrinkage rate inherently held by the tungsten carbide powder when sintering the same into cemented carbide. However, the inventors of the present invention have found that the density of a press-molded body formed from only the tungsten carbide powder is correlated to the shrinkage rate of the cemented carbide.

<Particle Size>

When the Fsss particle size is represented by a (μm) and the BET particle size converted from the BET specific surface area is represented by b (μm), a is 0.40 μm or more and 1.50 μm or less, and b/a is 0.17 or more and 0.35 or less.

If the ratio b/a is less than 0.17, a large amount of fine particles are present in the powder, which in turn decreases the bulk density and causes abnormal grain growth of tungsten carbide particles in the cemented carbide after sintering.

If the ratio b/a is greater than 0.35, the bulk density of the powder decreases, and thereby, the density of the press-molded body decreases, which in turn makes the shrinkage rate greater.

If the Fsss particle size is greater than 1.50 μm, the particles in the powder are likely to agglomerate as the conventional powder. If the Fsss particle size is 1.00 μm or less, the particles in the powder would be less likely to agglomerate. Preferably, the smaller the tungsten carbide particle size of the cemented carbide obtained by sintering the powder is, the higher the strength of the cemented carbide would be. Thus, the Fsss particle size of the powder is more preferably 1.00 μm or less.

On the other hand, if the Fsss particle size of the tungsten carbide powder is less than 0.40 μm, it is difficult to be produced according to a general carbonization method by mixing tungsten powder and carbon powder and heating the same. This is because when the tungsten particles are reduced from tungsten oxide, the finer the tungsten particles are, the more oxygen content will be generated in the oxidation reaction when the surface of the tungsten particles are exposed to the atmosphere, which thereby makes it difficult to adjust the carbon amount in the subsequent carbonization step.

BET particle size (μm)=6/(15.7×BET specific surface area), wherein 15.7 is the specific gravity (g/cm$^3$) of tungsten carbide.

<Volume>

It is preferable that both the full volume (FV) (cm$^3$/100 g) and the tapped volume (TV) (cm$^3$/100 g) are small.

When the tapped volume (TV) (cm$^3$/100 g) is represented by y, it is preferable that y=−5.97a+z (z=22.56 or less).

This indicates that the tapped volume of the powder is smaller than that of the conventional powder.

The full volume is measured in the following manner. Specifically, 100 g of untreated tungsten carbide powder is charged into a glass container (a high-precision measuring cylinder (100 cm$^3$, class A) manufactured by Climbing Corporation) which is graduated every 1 cm$^3$ to the volume of 100 cm$^3$, and the volume of the tungsten carbide powder is measured without shaking.

The tapped volume (cm$^3$/100 g) is calculated from its tap density measured in accordance with the method of JIS Z 2512 (2012). The number of tapping is 3000 times.

<Particle Size Distribution>

When the particle size distribution D90 (μm) of the tungsten carbide powder which is measured without any pretreatment is represented by c, and the particle size distribution D90 (μm) of the tungsten carbide powder which is measured after the tungsten carbide powder is pretreated in such a manner that 0.5 g of the tungsten carbide powder is placed into a capsule container which has an inner diameter of 13 mm and a height of 26 mm and is equipped with one cemented carbide ball having a diameter of 6 mm, and mixed by using a 8000 M mixer/mill manufactured by SPEX Sample Prep for 5 minutes is represented by d, if the value of c-d is small, the powder is less likely to agglomerate. Thus, when such powder is mixed with cobalt powder or the like for manufacturing the cemented carbide, it is easy to loosen, and thereby, the mixing may be carried out in a shorter time.

The conventional tungsten carbide fine powder is likely to agglomerate, and thereby, the particle size distribution D90 changes greatly before and after the pretreatment. The particle size distribution is measured by the laser diffraction/scattering method. Pure water is used as a solvent, the particle refractive index is 1.90, and the solvent refractive index is 1.33. 1 vol % aqueous solution of an aqueous dispersion agent SN Dispersant 5027 manufactured by San Nopco Limited is used as a dispersing aid, and about 0.02 g of tungsten carbide powder is subjected to ultrasonic dispersion treatment for 3 minutes. The particle size distribution is measured by using a MT3300EX II laser light diffraction/scattering machine manufactured by Microtrac-BEL.

2. (Production Method)

Tungsten carbide powder is produced by a general carbonization method. According to the general carbonization method, the tungsten carbide powder is produced through step 1 (preparation of raw material), step 2 (reduction step), step 3 (formulation and mixing step), step 4 (carbonization step), step 5 (pulverization step).

<Details of Steps>

Step 1: Preparation of Raw Material

The oxide raw material is mainly selected from $WO_3$, $WO_{2.9}$ ($WO_{20}O_{58}$), $WO_{2.72}$ ($W_{18}O_{49}$), $WO_2$ and the like. If the raw material is preliminarily pulverized and the particle size thereof is made uniform, it is possible to further reduce the bulk. It is preferable to sieve the raw material with a sieve having a defined mesh size so as to make the particle size uniform, which makes precise adjustment possible in the next step.

Step 2: Reduction Step

The optimum reduction condition (for example, temperature, hydrogen flow rate, the charged amount of raw material, and equipment to be used) may be appropriately selected according to the selected raw material and the sieving treatment carried out in step 1. Particularly in this step, the uniform thickness of the raw material charged into the reduction vessel, the uniform exposure to hydrogen gas, and the uniform heating are important for achieving a powder with uniform particle size and less particle agglomerates, in other words, important for achieving a lower bulk. A low temperature, a high hydrogen flow rate, and a small amount of the raw material charged into the reduction vessel are likely to reduce particle agglomerates. In this step, the tungsten oxide powder is reduced to produce tungsten powder.

Preferably, the reduction temperature is 600° C. or more and 1000° C. or less. Preferably, the raw material is charged into a predetermined container at a layer thickness of 1 mm or more and 50 mm or less, and more preferably at a layer thickness of 1 mm or more and 10 mm or less.

When charging the raw material powder into the predetermined container, the raw material may be charged in two layers, i.e., the coarse raw material is charged into an upper portion of the container, and the fine raw material is charged into a lower portion of the container. Thus, by charging the coarse raw tungsten material having a coarse particle size into the upper portion where the coarse raw tungsten material is easy to be reduced and after reduction the particle size thereof is likely to become finer, the difference between the particle size of the raw material powder in the upper portion and the particle size of the raw material powder in the lower portion is less likely to occur, and in addition, the water vapor generated from the reduction reaction as a grain growth factor in the lower portion is easy to pass through the upper portion, it is likely to obtain tungsten (W) powder with less particle agglomerates as a whole. The charging is not limited to two-layer charging.

In the two-layer charging, it is preferable that the particle size of the raw material powder in the upper portion is 75 μm or more and 200 μm or less and the particle size of the raw material powder in the lower portion is 24 μm or more and 105 μm or less. In the two-layer charging, it is preferable that the layer thickness of the raw material powder in the upper portion occupies 50% or more and 90% or less of the entire lay thickness and the layer thickness of the raw material powder in the lower portion occupies the rest.

Step 3: Formulation and Mixing Step

In this step, tungsten (W) powder prepared in step 2 is formulated and mixed with carbon (C) powder, and if necessary with chromium oxide powder or the like. In this step, the agglomeration of the tungsten carbide powder may be reduced by selecting equipments and conditions for more homogeneous mixing, which thereby reduces the bulk of the tungsten carbide powder.

The formulation amount of carbon may be suitably adjusted depending on the atmosphere, the oxygen content in the W powder or the like in the carbonization step. It is preferable to adjust the ratio of the mass of carbon relative to the total mass of the obtained tungsten carbide powder to 6.00% or more and 6.30% or less. In the case of obtaining fine tungsten carbide powder, fine tungsten powder is required in the reduction step. However, if the tungsten carbide powder is fine, the surface area thereof is large, which makes it easy to be oxidized when it is exposed to the atmosphere, and thereby making difficult the adjustment of the carbon amount after carbonization.

Step 4: Carbonization Step

In this step, the powder mixed in step 3 is heat-treated. The carbonization condition (for example, temperature, atmosphere (nitrogen, hydrogen, vacuum or the like), the charged amount of raw material, equipment to be used) may be selected appropriately. In particular, it is preferable that the carbonization temperature is lower. This is because that the lower the carbonization temperature is, the more difficult for the particles to cluster and agglomerate during the heat treatment.

Preferably, the carbonization temperature is 1000° C. or more and 1700° C. or less, and more preferably 1000° C. or more and 1500° C. or less. The heating time may be appropriately adjusted in accordance with the carbonization temperature. The atmosphere may be selected from nitrogen, hydrogen, vacuum or the like mentioned above. Preferably, the powder mixture is charged into a predetermined container at a layer thickness of 500 mm or less, and more preferably at a layer thickness of 200 mm or less, which is advantageous in that a difference in particle size is less likely to occur due to the charging position in the container.

Step 5: Pulverization Step

In this step, the tungsten carbide powder subjected to the carbonization treatment in step 4 is pulverized. After the carbonization treatment, since the powders cluster together to form agglomerates, pulverization is necessary, and the pulverization condition (equipment to be used, setting conditions and the like) may be appropriately selected. Although the stronger the pulverization equipment or the pulverization condition is, the more the agglomeration will be reduced, if the primary grain of tungsten carbide is pulverized, it may bring about such problems as the formation of coarse grains during the sintering of the cemented carbide, excessive fine powder and re-agglomeration of particles, which thereby increase the bulk. Thus, the pulverization condition should be adjusted appropriately for each equipment so that primary particles are not pulverized.

The tungsten carbide powder may be produced via the above steps 1 to 5.

<Density of Press-Molded Body>

The tungsten carbide powder according to the present embodiment has the effect of lowering the shrinkage rate when sintering a press-molded body so as to obtain cemented carbide. In the present embodiment, the tungsten carbide powder alone is pressed, and the density of the press-molded body is measured, and it is found that the density of the press-molded body is higher than the density of a press-molded body formed from a conventional powder.

As a method for determining the density of a press-molded body, 20 g of tungsten carbide powder was packed into a mold having a length of 10 mm and a width of 30 mm, and pressed at a pressure of 98 MPa to obtain a press-molded body, the length, width and height of the press-molded body were measured to calculate the volume, and the density was calculate by dividing the mass of 20 g by the volume.

The density of the press-molded body may exhibit the effect of the tungsten carbide powder of the embodiment.

When the density of the press-molded body is represented by p ($g/cm^3$), the density of the press-molded body exhibiting the effect of the tungsten carbide powder of the embodiment can be expressed as $p=1.86a+q$ ($q=6.8$ or more). If the density of the press-molded body is smaller than this, it is difficult to guarantee the pressing property and the shrinkage rate of cemented carbide to be manufactured.

EXAMPLES (1) Example 1

Step 1

Raw material: $WO_{2.9}$ powder composed of particles having a particle size of 200 μm or less was used as the raw material.

Hereinafter, the raw material used in each of Examples and Comparative Examples was composed of particles having a particle size of 200 μm or less.

Raw material treatment: After the raw material is pulverized, a sieve shaker was used to sieve the pulverized material so as to obtain a sieve powder which passes through a sieve with a mesh size of 105 μm but remains on another sieve with a mesh size of 38 μm (hereinafter referred to as "powder 1"), and a sieve powder which remains on a sieve with a mesh size of 105 μm (hereinafter referred to as "powder 2"), and the powder 1 and the powder 2 were used as the raw material. The pulverization apparatus is not limited, and any conventional dry-grinding machine may be used. The sieve shaker is not limited, and any sieving machine may be used.

Step 2

Charging: After the powder 1 was charged into a predetermined container of a pusher-type reduction furnace, the same amount of the powder 2 was charged into the upper portion thereof so that the powders were charged in two layers. The entire layer thickness was set to 6 mm, the powder 1 and the powder 2 were each charged at a layer thickness of 3 mm. The reduction treatment was carried out at a temperature of 840° C. for 180 minutes under hydrogen atmosphere to obtain W powder.

Fsss Particle size: The Fsss particle size of the obtained W powder was 0.85 μm.

Step 3

C Powder Mixing: C powder having a particle size of about 1 μm was formulated into the tungsten powder so that the ratio of carbon in tungsten carbide was 6.20 mass %, and then the powder was packed into a container of a ball mill at 30 vol %. Cemented carbide balls each having a diameter of 8 mm were also packed into the same container at 30 vol %. The tungsten powder and the carbon powder were mixed in the ball mill for 180 minutes to obtain a powder mixture.

Step 4

Carbonization atmosphere and carbonization temperature for the powder mixture: The powder mixture was subjected to carbonization treatment at a temperature of 1400° C. for 180 minutes under vacuum atmosphere. The powder mixture was packed in the carbon container at a layer thickness of 500 mm.

Step 5

Pulverization condition: After the carbonization treatment, the carbonized powder was packed into a container of a ball mill at 30 vol %. Cemented carbide balls each having a diameter of 8 mm were packed into the container at 30 vol %, and the carbonized powder was pulverized in the ball mill for 180 minutes to obtain tungsten carbide powder.

(2) Examples 2-10

In Examples 2 to 10, tungsten carbide powder was produced according to the conditions shown in the following tables.

TABLE 1

| | Raw Material | Raw Material Treatment | Charging | Reduction Temperature (° C.) | WPowder Fsss Particle Size (μm) |
|---|---|---|---|---|---|
| Example 1 | $WO_{2.9}$ | sieving (38/105 μm) | 2-layer | 840 | 0.85 |
| Example 2 | $WO_{2.9}$ | sieving (38/105 μm) | 2-layer | 800 | 0.71 |
| Example 3 | $WO_3$ | sieving (38/105 μm) | 2-layer | 860 | 0.93 |
| Example 4 | $WO_{2.9}$ | sieving (24/75 μm) | 2-layer | 800 | 0.51 |
| Example 5 | $WO_{2.9}$ | sieving (24/75 μm) | 2-layer | 820 | 0.60 |
| Example 6 | $WO_{2.9}$ | sieving (38/105 μm) | 2-layer | 790 | 0.63 |
| Example 7 | $WO_{2.9}$ | sieving (38/105 μm) | 2-layer | 780 | 0.65 |
| Example 8 | $WO_3$ | sieving (38/105 μm) | 2-layer | 800 | 0.80 |
| Example 9 | $WO_3$ | sieving (38/105 μm) | 2-layer | 950 | 1.50 |
| Example 10 | $WO_{2.9}$ | sieving (24/75 μm) | 2-layer | 650 | 0.40 |

TABLE 2

| | C Powder Mixing | Carbonization Atmosphere | Carbonization Temperature (° C.) | Pulverization Condition |
|---|---|---|---|---|
| Example 1 | Henschel mixer | vacuum | 1400 | ball mill |
| Example 2 | Henschel mixer | Ar | 1400 | ball mill |
| Example 3 | ball mill | vacuum | 1600 | impact-type crusher |
| Example 4 | ball mill | $H_2$ | 1250 | ball mill |
| Example 5 | ball mill | Ar | 1400 | impact-type crusher |
| Example 6 | Henschel mixer | vacuum | 1450 | ball mill |
| Example 7 | ball mill | $H_2$ | 1300 | ball mill |
| Example 8 | ball mill | vacuum | 1500 | impact-type crusher |
| Example 9 | ball mill | vacuum | 1600 | impact-type crusher |
| Example 10 | Henschel mixer | Ar | 1100 | ball mill |

"Sieving (38/105 μm)" in the column of "Raw Material Treatment" refers to that a sieve powder which passes through a sieve with a mesh size of 105 μm but remains on another sieve with a mesh size of 38 μm and a sieve powder which remains on a sieve with a mesh size of 105 μm was used as the raw material. The reduction time was the substantially same as that in Example 1, and the hydrogen flow rate was adjusted so as to obtain the W powder Fsss particle size listed in Table 1. In Example 10, chromium oxide was added in the C powder mixing step so that the ratio of Cr relative to tungsten carbide is 0.8 mass %.

The carbonization time was substantially set to 180 minutes and adjusted so as to obtain the Fsss particle size listed in Table 5.

After carbonization, when a ball mill was used to pulverize the carbonized powder, the ball packing amount and the powder packing amount were the same as those in the previous step, i.e., the C powder mixing step, and when an impact-type crusher was used, the hammer functioning as a pulverization member was set to 8000 rpm. Since the mixing effect of an impact-type crusher is weak, the powder was further mixed for 5 minutes with the ball mill for uniform mixing.

(3) Comparative Examples

Next, tungsten carbide powder according to a comparative example was prepared.

Comparative Example 1

Similar to the Examples, $WO_3$ powder having a particle size of 200 μm or less was used as the raw material. However, the pulverization treatment and the sieving treatment were not carried out. The raw material was charged into a predetermined container of a pusher-type reduction furnace at the same amount as in Example 1. The reduction treatment was carried out at a temperature of 800° C. under hydrogen atmosphere to obtain W powder. The Fsss particle size of the obtained W powder was 0.85 μm. Similar to Example 1, C powder was formulated so that the ratio of carbon in tungsten carbide was 6.20 mass %, and mixed in a Henschel mixer for 30 minutes. The carbonization treatment was carried out at a temperature of 1500° C. for 180 minutes under vacuum atmosphere. The carbonized powder was pulverized at 8000 rpm by using an impact-type crusher and mixed in the ball mill for 5 minutes to obtain tungsten carbide powder.

Comparative Example 2

Similar to the Examples, $WO_3$ powder having a particle size of 200 μm or less was used as the raw material. However, the pulverization treatment and the sieving treatment were not carried out. The raw material was charged into a predetermined container of a pusher-type reduction furnace at the same amount as in Example 1. The reduction treatment was carried out under a hydrogen atmosphere at a temperature of 780° C. to obtain W powder. The Fsss particle size of the obtained W powder was 0.73 μm. Similar to Example 1 and Comparative Example 1, C powder was formulated and mixed in a Henschel mixer for 30 minutes. The carbonization treatment was carried out at a temperature of 1500° C. for 180 minutes under vacuum atmosphere. The carbonized powder was pulverized at 8000 rpm by using an impact-type crusher and mixed in the same manner as in Comparative Example 1 to obtain tungsten carbide powder.

Comparative Example 3

Similar to the Examples, $WO_{2.9}$ having a particle size of 200 μm or less was used as the raw material. However, the pulverization treatment and the sieving treatment were not carried out. The raw material was charged into a predetermined container of a pusher-type reduction furnace at the same amount as in Example 1. The reduction treatment was carried out under a hydrogen atmosphere at a temperature of 770° C. to obtain W powder. The Fsss particle size of the obtained W powder was 0.51 μm. Similar to Example 1 and Comparative Examples 1 and 2, C powder was formulated and mixed in a Henschel mixer for 30 minutes. The carbonization treatment was carried out at a temperature of 1400° C. for 180 minutes under vacuum atmosphere. The carbonized powder was pulverized at 8000 rpm by using an impact-type crusher and mixed in the same manner as in Comparative Example 1 to obtain a tungsten carbide powder.

In Comparative Examples 4 and 5, the tungsten carbide powder was produced according to the conditions listed in Tables 3 and 4 below. Similar to Comparative Example 1, the reduction time and the carbonization time were adjusted so as to obtain the particle size listed in Table 7.

TABLE 3

| | Raw Material | Raw Material Treatment | Charging | Reduction Temperature (° C.) | W Powder Fsss Particle Size (μm) |
|---|---|---|---|---|---|
| Comparative Example1 | $WO_3$ | none | 1-layer | 800 | 0.85 |
| Comparative Example2 | $WO_3$ | none | 1-layer | 780 | 0.73 |
| Comparative Example3 | $WO_{2.9}$ | none | 1-layer | 770 | 0.51 |
| Comparative Example4 | $WO_3$ | none | 1-layer | 800 | 0.91 |
| Comparative Example5 | $WO_3$ | none | 1-layer | 850 | 1.39 |

TABLE 4

| | Carbon Mixing | Carbonization Atmosphere | Carbonization Temperature (° C.) | Pulverization Condition |
|---|---|---|---|---|
| Comparative Example1 | Henschel mixer | vacuum | 1500 | impact-type crusher |
| Comparative Example2 | Henschel mixer | vacuum | 1500 | impact-type crusher |
| Comparative Example3 | Henschel mixer | vacuum | 1400 | impact-type crusher |
| Comparative Example4 | Henschel mixer | vacuum | 1500 | impact-type crusher |
| Comparative Example5 | Henschel mixer | vacuum | 1600 | impact-type crusher |

(4) Evaluation of Tungsten Carbide Powder

Physical properties of tungsten carbide according to the examples and comparative examples were evaluated. Specifically, the Fsss particle size, the BET specific surface area, the full volume (FV: v), the tapped volume (TV: y), and particle size distribution D90 with or without pretreatment were measured by the particle size distribution measurement method. The results are shown in Tables 5 to 8. Further, the density of the press-molded body was obtained in the following manner: 20 g of tungsten carbide powder was charged into a mold having a length of 10 mm and a width of 30 mm at a uniform thickness and pressed at a pressure of 98 MPa to obtain a press-molded body, the length, width and height of the press-molded body were measured to obtain the volume, and the density was calculate by dividing the mass of 20 g by the volume.

TABLE 5

| | WC Powder Fsss Particle Size (μm) | BET Specific Surface Area (m²/g) | BET Particle Size (μm) | b/a (BET Particle Size/Fsss Particle Size) | FV:v | TV:y |
|---|---|---|---|---|---|---|
| Example 1 | 0.80 | 1.76 | 0.217 | 0.271 | 31 | 15.0 |
| Example 2 | 0.71 | 1.57 | 0.243 | 0.342 | 34 | 16.2 |
| Example 3 | 0.96 | 1.31 | 0.292 | 0.304 | 28 | 14.4 |
| Example 4 | 0.53 | 3.07 | 0.124 | 0.234 | 32 | 17.2 |
| Example 5 | 0.59 | 2.40 | 0.159 | 0.269 | 34 | 17.0 |
| Example 6 | 0.62 | 2.20 | 0.174 | 0.281 | 33 | 16.4 |
| Example 7 | 0.64 | 3.47 | 0.110 | 0.172 | 28 | 15.2 |
| Example 8 | 0.83 | 1.32 | 0.290 | 0.349 | 33 | 17.8 |
| Example 9 | 1.50 | 0.73 | 0.524 | 0.349 | 25 | 13.6 |
| Example 10 | 0.40 | 4.02 | 0.095 | 0.238 | 36 | 18.2 |

TABLE 6

| | z | c: Particle Size D90 (μm) (untreated) | d: Particle Size D90 (μm) (pretreated) | c − d (μm) | Density of Press-Molded Body (g/cm³) | q |
|---|---|---|---|---|---|---|
| Example 1 | 19.78 | 1.323 | 1.234 | 0.089 | 8.43 | 6.94 |
| Example 2 | 20.44 | 1.230 | 1.033 | 0.197 | 8.55 | 7.23 |
| Example 3 | 20.13 | 1.415 | 1.341 | 0.074 | 8.6 | 6.81 |
| Example 4 | 20.36 | 0.991 | 0.902 | 0.089 | 7.80 | 6.81 |
| Example 5 | 20.52 | 1.035 | 1.009 | 0.026 | 8.00 | 6.90 |
| Example 6 | 20.10 | 1.584 | 1.266 | 0.318 | 7.95 | 6.80 |
| Example 7 | 19.02 | 0.896 | 0.684 | 0.212 | 8.00 | 6.81 |
| Example 8 | 22.76 | 1.523 | 1.263 | 0.260 | 8.42 | 6.88 |
| Example 9 | 22.56 | 2.069 | 1.907 | 0.162 | 9.62 | 6.83 |
| Example 10 | 20.59 | 0.892 | 0.873 | 0.019 | 7.54 | 6.80 |

TABLE 7

| | WC Powder Fsss Particle Size (μm) | BET Specific Surface Area (m²/g) | BET Particle Size (μm) | b/a (BET Particle Size/Fsss Particle Size) | FV:v | TV:y |
|---|---|---|---|---|---|---|
| Comparative Example1 | 0.83 | 1.17 | 0.327 | 0.394 | 48 | 22.6 |
| Comparative Example2 | 0.67 | 1.53 | 0.250 | 0.373 | 53 | 23.4 |
| Comparative Example3 | 0.52 | 1.90 | 0.201 | 0.387 | 65 | 27.6 |
| Comparative Example4 | 0.98 | 0.92 | 0.415 | 0.423 | 44 | 19.4 |
| Comparative Example5 | 1.47 | 0.59 | 0.648 | 0.441 | 37 | 15.8 |

TABLE 8

| | z | c: Particle Size D90 (μm) (untreated) | d: Particle Size D90 (μm) (pretreated) | c − d (μm) | Density of Press-Molded Body (g/cm³) | q |
|---|---|---|---|---|---|---|
| Comparative Example1 | 27.56 | 2.547 | 2.003 | 0.544 | 7.95 | 6.41 |
| Comparative Example2 | 27.40 | 3.064 | 2.276 | 0.788 | 7.61 | 6.36 |
| Comparative Example3 | 30.70 | 2.469 | 1.835 | 0.643 | 7.42 | 6.45 |
| Comparative Example4 | 25.25 | 3.285 | 2.363 | 0.922 | 8.30 | 6.48 |
| Comparative Example5 | 24.58 | 3.861 | 2.996 | 0.865 | 9.33 | 6.60 |

As seen from Table 5, it is obvious that in the tungsten carbide powder according to the examples, the Fsss particle size a is 0.40 μm or more and 1.50 μm or less, and b/a is 0.17 or more and 0.35 or less.

On the other hand, as seen from Table 7, it is obvious that in Comparative Examples 1 to 5, b/a is greater than 0.35, and both FV and TV are larger than those in Examples.

Further, when comparing Comparative Examples 1 to 4 with Comparative Example 5, it is obvious that the FV of Comparative Example 5 is smaller. This is because that the Fsss particle size of the WC powder according to Comparative Example 5 is large, and thereby, the coarse particles is difficult to agglomerate, and the void is less likely to occur between the particles. In Comparative Example 5 where the Fsss particle size is around 1.5 μm (Fsss=1.47 μm), the FV is 37, which is a comparatively favorable value although it is not as good as that of the sample in the example. In contrast, in Comparative Examples 1 to 4 where the Fsss particle size is 1 μm or less, the FV is 44 or more, which is larger than that in Examples 1 to 8 and 10 where the Fsss particle size is 1 μm or less.

Figure 7:
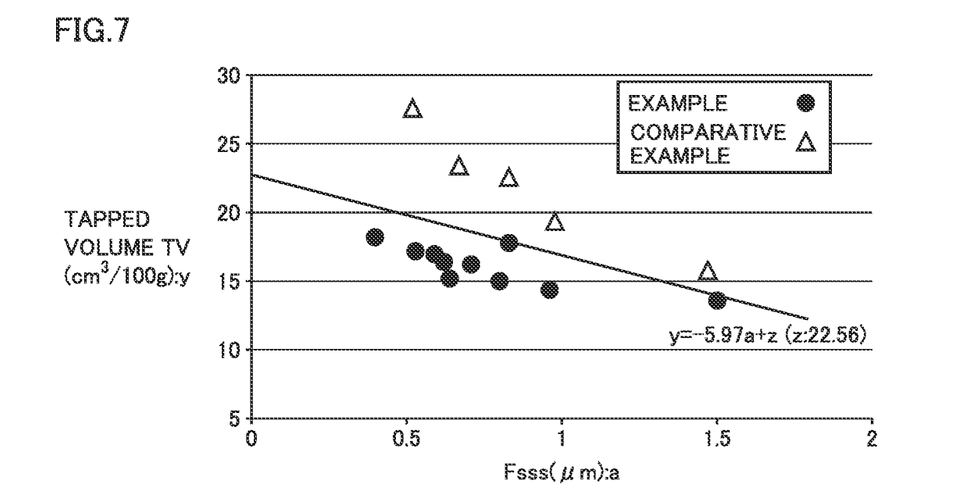
FIG. 7 is a graph illustrating the relationship between the Fsss particle size and the tapped volume (TV) of the tungsten carbide powder.

Further, the relationship between TV and Fsss (y=−5.97a+z) is illustrated in FIG. 7. The z value is taken from those listed in Tables 6 and 8. Although the z value in Comparative Example 5 is lower than the z value in the Example, it is closer to that in the Example. On the other hand, z in the TV relationship of the fine powder in each of Comparative Examples 1 to 4 was significantly different from that in the example.

Therefore, although in the present invention the Fsss particle size a is 0.40 μm or more and 1.50 μm or less, it was found that if the Fsss particle size a is 0.40 μm or more and 1.00 μm or less, the agglomeration of particles can be further inhibited, and the bulk can be further lowered, resulting in an extremely excellent effect.

The values of c-d indicating the ease of loosening tungsten carbide powder are listed in Tables 6 and 8. When the powder of the examples and the powder having comparable particle size of the comparative examples are compared, it is found that the value of c-d for the powder of the example is smaller. In other words, the tungsten carbide powder of the examples is less likely to agglomerate.

Figure 8:
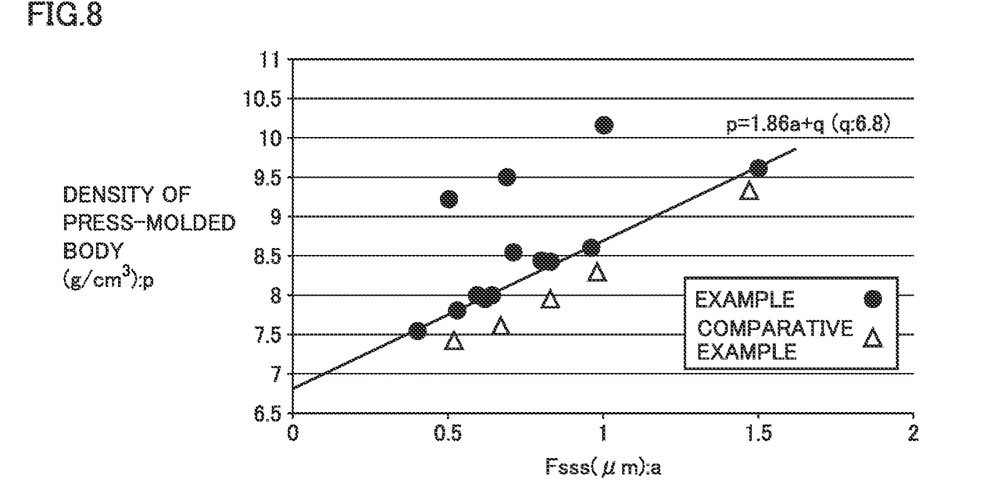
FIG. 8 is a graph illustrating the relationship between the Fsss particle size of the tungsten carbide powder and the density of the press-molded body.

The densities of the press-molded body are listed in Tables 6 and 8, and are illustrated in FIG. 8. In the examples, p=1.86a+q (q=6.8 or more). It is obvious that the density of the press-molded body molded from the tungsten carbide powder of each example is higher than that of each comparative example.

The tungsten carbide powder obtained in Example 1 and the tungsten carbide powder obtained in Comparative Example 1 were used to produce cemented carbide, respectively, and the influence of the density of the press-molded body molded from the tungsten carbide powder on the shrinkage rate of the cemented carbide was confirmed.

The tungsten carbide powder of Example 1 and the cobalt powder were weighed so that the mass ratio of the tungsten carbide powder of Example 1 relative to the cobalt powder having the Fsss particle size of 1.4 μm was 90:10. The 2 powders were added to an ethanol solvent, and mixed in a ball mill for 48 hours, and the powders passing through a 500-mesh sieve were dried to prepare cemented carbide powder (hereinafter referred to as "cemented carbide powder 1") of Example 1 including tungsten carbide powder as the raw material. 20 g of the powder was packed into a mold having a length of 10 mm and a width of 30 mm, molded under a pressure of 98 MPa and sintered at 1400° C. under vacuum atmosphere to produce a sintered body. The average linear shrinkage rate obtained by averaging the linear shrinkage rate of the cemented carbide in each of three directions for the sintered body formed from the cemented carbide powder 1 was 19.2%. The linear shrinkage rate was calculated according to the following formula. Note that the HIP treatment described in Patent Literature 1 was not performed.

linear shrinkage rate=(dimension of the press-molded body−dimension of the sintered body)/dimension of the press-molded body×100

The tungsten carbide powder of Comparative Example 1 and the cobalt powder were weighed so that the mass ratio of the tungsten carbide powder of Comparative Example 1 relative to the cobalt powder was 90:10. In the same manner as the preparation of the cemented carbide powder 1, the tungsten carbide powder and the cobalt powder were used as the raw material to prepare cemented carbide powder (hereinafter referred to as "cemented carbide powder 2") of Comparative Example 1 including tungsten carbide powder as the raw material.

Carbide powder 2 was sintered in the same manner as cemented carbide powder 1. The average linear shrinkage rate was 20.8%. Compared with the cemented carbide powder 2, it was confirmed that the cemented carbide powder 1 has a smaller shrinkage rate.

Similarly, the average linear shrinkage rate measured from the sample of each of Example 7 and Comparative Example 2 was 19.5% and 21.3%, respectively.

Practically, the composition of the tungsten carbide powder and the cobalt powder and the like are appropriately adjusted and used as a ready-to-press powder to prepare cemented carbide, as a standard for evaluating the shrinkage rate after sintering, it is preferable to use the density of a press-molded body made of tungsten carbide powder alone.

Further, the warpage in the thickness direction of the sintered body formed from the cemented carbide powders 1 and 2 respectively was measured. The warpage was measured in the following manner the sintered body was placed on a flat surface with the convex surface of the sintered body pointing upward, the height of both lateral ends and the height of the central part were measured with a height gauge or the like, and the difference between the height of the central part and the average of the heights of both lateral ends was calculated as the warpage.

The warpage for the sintered body made of the cemented carbide powder 1 was 0.05 mm, and the warpage for the sintered body made of the cemented carbide powder 2 was 0.075 mm. It is confirmed that the powder according to the embodiment has the effect of suppressing deformation. Although in the above description, the mold has a simple shape, in the case of a mold having complicated steps, cracks are confirmed in the stepped portion, and it is considered that the cracks are caused by the difference in shrinkage rate and warpage mentioned above.

Also, 20 g of the cemented carbide powder 1 and the cemented carbide powder 2 each was packed into a mold having a length of 10 mm and a width of 30 mm, the pressing pressure was adjusted so that the average linear shrinkage rate in three directions after sintering was 22%. The pressing pressure for the cemented carbide powder 1 was 44.1 MPa, and the pressing pressure for the cemented carbide powder 2 was 98.0 MPa, and thereby, it is confirmed that the powder according to the embodiment has the effect of lowering the press molding pressure.

According to the above description, in order to produce a low bulk tungsten carbide powder, it is important to prevent the agglomeration of particles from occurring in the reduction reaction as much as possible, it is also necessary not to extremely pulverize the particle agglomerates in the carbonized powder.

In addition, it is found that a low bulk tungsten carbide powder is less likely to agglomerate and the particle agglomerates are easy to be loosen, and the density of the press-molded body affects the press properties in producing the cemented carbide, the shrinkage rate and the warpage in sintering. Powder characteristics that affect the press properties, the shrinkage rate and the like include the Fsss particle size representing the agglomeration degree, the BET particle size, the bulk, the tapped volume, the density of the press-molded body and the like. As illustrated in FIGS. 7 and 8, the tapped volume and the density of the press-molded body were found to be effective in evaluating the effects as a function of the Fsss particle size.

REFERENCE SIGNS LIST

10: tungsten carbide powder; 20: sintered body; 21: crack

The invention claimed is:

1. A tungsten carbide powder satisfying such a condition that when the Fsss particle size thereof is represented by a (μm) and the BET particle size thereof converted from the BET specific surface area is represented by b (μm), a is 0.40 μm or more and 1.50 μm or less, and b/a is 0.17 or more and 0.35 or less, and the tapped volume ($cm^3$/100 g) is represented by y, $y=-5.97a+z$ ($z=22.56$ or less).

2. The tungsten carbide powder according to claim 1, wherein the Fsss particle size a (μm) is 0.40 μm or more and 1.00 μm or less.

3. The tungsten carbide powder according to claim 1, wherein when the tungsten carbide powder is pressed at a pressure of 98 MPa and molded into a press-molded body, and the density (g/$cm^3$) of the press-molded body is represented by p, $p=1.86a+q$ ($q=6.8$ or more).

* * * * *